(12) United States Patent
Wu et al.

(10) Patent No.: US 11,734,573 B2
(45) Date of Patent: Aug. 22, 2023

(54) IMAGE ELEMENT MATCHING VIA GRAPH PROCESSING

(71) Applicant: Alibaba Group Holding Limited, Grand Cayman (KY)

(72) Inventors: Tengfei Wu, Hangzhou (CN); Miaomiao Cui, Hangzhou (CN); Xuansong Xie, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 55 days.

(21) Appl. No.: 17/134,924

(22) Filed: Dec. 28, 2020

(65) Prior Publication Data
US 2021/0248412 A1    Aug. 12, 2021

(51) Int. Cl.
| | | |
|---|---|---|
| *G06N 3/08* | (2023.01) | |
| *G06N 3/084* | (2023.01) | |
| *G06F 18/22* | (2023.01) | |
| *G06F 18/21* | (2023.01) | |
| *G06V 10/75* | (2022.01) | |
| *G06V 10/764* | (2022.01) | |
| *G06V 10/82* | (2022.01) | |
| *G06V 10/44* | (2022.01) | |
| *G06N 20/00* | (2019.01) | |

(52) U.S. Cl.
CPC ........... *G06N 3/084* (2013.01); *G06F 18/217* (2023.01); *G06F 18/22* (2023.01); *G06V 10/451* (2022.01); *G06V 10/751* (2022.01); *G06V 10/764* (2022.01); *G06V 10/82* (2022.01); *G06N 20/00* (2019.01)

(58) Field of Classification Search
CPC .. G06K 9/6201; G06K 9/6262; G06K 9/6276; G06N 20/00; G06N 3/0481; G06N 3/084; G06N 3/0454; G06N 3/08; G06V 10/451; G06V 10/751; G06V 10/764; G06V 10/82
See application file for complete search history.

(56) References Cited

U.S. PATENT DOCUMENTS

| | | |
|---|---|---|
| 8,539,336 B2 | 9/2013 | Griffiths et al. |
| 8,543,573 B2 | 9/2013 | MacPherson |
| 8,726,186 B2 | 5/2014 | Grosz et al. |
| 9,256,806 B2 | 2/2016 | Aller et al. |
| 9,270,965 B2 | 2/2016 | Sandrew et al. |

(Continued)

OTHER PUBLICATIONS

Zhang et al., "Knowledge Graph-Based Image Classification Refinement", IEEE Access, Special Section on Biologically Inspired Image Processing Challenges and Future Directions (Year: 2019).*

*Primary Examiner* — Qian Yang
(74) *Attorney, Agent, or Firm* — James J. DeCarlo; Greenberg Truarig, LLP (57) ABSTRACT

The present application discloses an image element matching method and apparatus, a model training method and apparatus, and a data processing method. The issue of finding image information matching a given image element is converted into the issue of predicting, from a matching knowledge graph, whether or not an edge is present between a node corresponding to the given image element and another node in the matching knowledge graph. Therefore, matching between image elements is flexibly implemented, matching performance is improved, and labor costs are reduced.

20 Claims, 8 Drawing Sheets

(56) References Cited

U.S. PATENT DOCUMENTS

| | | |
|---|---|---|
| 9,785,914 B2 | 10/2017 | Gupta et al. |
| 9,880,712 B2 | 1/2018 | Slawson et al. |
| 9,978,003 B2 | 5/2018 | Sachs et al. |
| 10,182,247 B2 | 1/2019 | Mertens |
| 10,380,650 B2 | 8/2019 | Hamedi et al. |
| 10,572,498 B2 | 2/2020 | Silverstein et al. |
| 2015/0229978 A1 | 8/2015 | Brown et al. |
| 2016/0283049 A1* | 9/2016 | Faydi ................. G06F 3/04842 |
| 2019/0138573 A1 | 5/2019 | Land et al. |
| 2019/0258895 A1* | 8/2019 | Sacheti ............... G06V 10/751 |
| 2020/0245036 A1 | 7/2020 | Ortiz et al. |
| 2020/0257437 A1 | 8/2020 | Fitzpatrick |
| 2021/0192375 A1* | 6/2021 | Xia ....................... G06N 20/00 |

\* cited by examiner

IMAGE ELEMENT MATCHING VIA GRAPH PROCESSING

CROSS-REFERENCE TO RELATED APPLICATIONS

This application claims the benefit of priority of Chinese Application No. 202010087574.2, filed on Feb. 11, 2020, which is hereby incorporated by reference in its entirety.

BACKGROUND

Technical Field

The present application relates to but is not limited to industrial intelligence technologies, and in particular, relates to methods, apparatuses, and computer-readable media, for image element processing.

Description of the Related Art

In current systems, the problem of image element matching is solved using a pre-generated template or rule. This technique results in poor flexibility, poor diversity, and high design costs. Additionally, some systems perform image element matching by pre-designing a graph autoencoder. However, it is difficult to perform large-scale image training using this approach, and the visual features of graph nodes are required to be pre-calculated. Therefore, an ideal matching result is unavailable in current systems.

BRIEF SUMMARY

The present application provides methods, apparatuses, and computer-readable media for image element matching, model training, and data processing, which can be flexibly adapted to large-scale image training and used to improve matching performance.

In one embodiment, a data processing method comprises receiving an image to be processed, acquiring at least one original image element in the image to be processed, acquiring, based on a knowledge graph, a target image element corresponding to the original image element, wherein image elements are regarded as nodes and relationships between the image elements are regarded as edges in the knowledge graph and returning the target image element.

In another embodiment, an image element matching comprises adding an image element to be processed to a matching knowledge graph and using the same as a node to be processed, extracting feature information of nodes in the matching knowledge graph according to adjacent node information representing matching relationships of the nodes in the matching knowledge graph, respectively encoding, according to the adjacent node information and the feature information, the nodes in the matching knowledge graph to acquire new feature information of the nodes, determining node pairs each of which has an edge therein according to the new feature information of the nodes, wherein the node pairs comprise a node pair formed by the node to be processed and any other node in the matching knowledge graph, and determining that an image element corresponding to a node that is connected to the node to be processed by an edge matches the image element to be processed.

In one embodiment, a step performed before the method comprises constructing the matching knowledge graph according to image elements of sample images, wherein the image elements of the sample images are regarded as nodes of the matching knowledge graph, and an edge is constructed between any two image elements in the same matching combination.

In one embodiment, the image elements of the sample images including Photoshop Document (PSD) files of a large number of banners as materials, and parsing each image file, equivalent to a PSD file, to acquire several image layers comprised in the PSD file, each image layer serving as an independent image element. In this embodiment, the constructing the matching knowledge graph according to image elements of sample images comprises using the independent image elements as the nodes of the matching knowledge graph and constructing an edge between any two image elements in the same matching combination.

In one embodiment, the feature information comprises an adjacency matrix, and extracting feature information of nodes in the matching knowledge graph comprises extracting a visual feature matrix of the nodes according to the adjacency matrix by using a convolutional neural network (CNN).

In one embodiment, the respectively encoding, according to the adjacent node information and the feature information, the nodes in the matching knowledge graph to acquire new feature information of the nodes comprises inputting the adjacency matrix and the feature information into a multi-layer graph convolutional neural network and respectively encoding the nodes in the matching knowledge graph to acquire new feature information of the nodes in the matching knowledge graph.

In one embodiment, determining node pairs, each of which has an edge therein comprises determining whether or not an edge is present in the node pair by calculating an edge connection probability of the node pair.

The present application further provides a computer-readable storage medium for storing computer-executable instructions, wherein the computer-executable instructions are used for performing the image element matching method according to any one of the above embodiments.

The present application further provides a device or apparatus for implementing image element matching, which comprises a memory and a processor, wherein the memory stores instructions executable by the processor, the instructions being used to perform steps of the image element matching method according to any one of the above embodiments.

In another embodiment, an image element matching method is disclosed, comprising adding an image element to be processed to a matching knowledge graph and using the same as a node to be processed, inputting adjacent node information representing matching relationships of nodes in the matching knowledge graph into a pre-trained matching model to perform processing, and if an edge is present in a node pair output by the matching model, determining that an image element corresponding to a node that is connected to the node to be processed by an edge matches the image element to be processed.

In one embodiment, the inputting adjacent node information representing matching relationships of nodes in the matching knowledge graph into a pre-trained matching model to perform processing comprises extracting feature information of the nodes in the matching knowledge graph according to the adjacent node information representing the matching relationships of the nodes in the matching knowledge graph, respectively encoding, according to the adjacent node information and the feature information, the nodes in the matching knowledge graph to acquire new feature information of the nodes, and determining whether or not an edge is present in each of node pairs according to the new feature information of the nodes, wherein the node pairs comprise a node pair formed by the node to be processed and any other node in the matching knowledge graph.

In one embodiment, a step performed before the method comprises training the matching model. In another embodiment, the matching model is a FedNet model.

The present application further provides a computer-readable storage medium for storing computer-executable instructions, wherein the computer-executable instructions are used for performing the image element matching method according to any one of the above embodiments.

The present application further provides a device for implementing image element matching, which comprises a memory and a processor, wherein the memory stores instructions executable by the processor, the instructions being used to perform steps of the image element matching method according to any one of the above embodiments.

The present application further provides a model training method, comprising constructing a matching knowledge graph according to image elements of sample images, wherein the image elements are regarded as nodes of the matching knowledge graph, and an edge is constructed between any two image elements in the same matching combination, dividing the matching knowledge graph into sub-graphs having a quantity equivalent to the number of matching combinations, wherein the number of matching combinations is the number of matching combinations comprised in the matching knowledge graph, acquiring a first adjacency matrix of each sub-graph, and inputting the acquired adjacency matrix into a preset matching model to perform end-to-end training to acquire a second adjacency matrix of the sub-graph, and comparing the first adjacency matrix with the second adjacency matrix, and adjusting parameters of the matching model according to a comparison result.

In one embodiment, the image elements of the sample images comprise PSD image information of a large number of banners as materials, and the method includes parsing each image file, equivalent to a PSD file, to acquire several image layers comprised in the PSD file, each image layer serving as an independent image element. In this embodiment, constructing a matching knowledge graph according to image elements of sample images comprises using the independent image elements as the nodes of the matching knowledge graph and constructing an edge between any two image elements in the same matching combination.

In one embodiment, dividing the matching knowledge graph into sub-graphs having a quantity equivalent to the number of matching combinations comprises forming the sub-graph in the matching knowledge graph by obtaining kth-order neighbor nodes from all nodes in each matching combination and dividing the matching knowledge graph into sub-graphs having a quantity equivalent to the number of matching combinations, wherein each sub-graph comprises a matching combination and kth-order adjacent nodes obtained from nodes of the matching combination.

In one embodiment, inputting the acquired adjacency matrix into a preset matching model to perform end-to-end training to acquire a second adjacency matrix of the sub-graph comprises extracting feature information of nodes in the sub-graph according to the first adjacency matrix representing matching relationships of the nodes in the sub-graph, respectively encoding, according to the first adjacency matrix and the feature information, the nodes in the sub-graph to acquire new feature information of the nodes, and determining whether or not an edge is present in a node pair according to the new feature information of the nodes, wherein the node pair is a node pair in the sub-graph and performing decoding to obtain the second adjacency matrix of the matching relationships of the nodes in the sub-graph.

In one embodiment, acquiring a first adjacency matrix of each sub-graph comprises constructing a positive edge set and a negative edge set for each sub-graph, regarding edges connected between two nodes of all the nodes in the matching combination of the sub-graph as the positive edge set, and randomly selecting edges formed by unconnected node pairs, having the same quantity as that in the positive edge set, as the negative edge set, wherein when an edge connected between a node $v_i$ and a node $v_j$ is present in the sub-graph, $A_{i,j}=1$ in the first adjacency matrix; otherwise, $A_{i,j}=0$ in the first adjacency matrix.

In one embodiment, the feature information comprises visual features; and extracting feature information of nodes in the sub-graph comprises extracting a visual feature matrix of the nodes according to the first adjacency matrix by using a convolutional neural network.

In one embodiment, the respectively encoding, according to the first adjacency matrix and the feature information, the nodes in the sub-graph to acquire new feature information of the nodes comprises inputting the first adjacency matrix and the feature information into a multi-layer graph convolutional neural network and respectively encoding the nodes in the sub-graph to acquire new feature information of the nodes in the sub-graph.

In one embodiment, determining whether or not an edge is present in a node pair comprises determining whether or not an edge is present in the node pair by calculating an edge connection probability of the node pair.

In one embodiment, comparing the first adjacency matrix with the second adjacency matrix and adjusting parameters of the matching model according to a comparison result comprises calculating a loss for each sample using a loss function, obtaining an average value of the losses of all samples, and regarding the same as a target loss, and updating the parameters of the matching model according to the target loss by using a backpropagation (BP) algorithm, wherein the samples comprise: positive samples $p_t=p_{i,j}$ and negative samples $p_t=1-p_{i,j}$, where $p_{i,j}$ is the edge connection probability of a node pair $(v_i, v_j)$.

The present application further provides a computer-readable storage medium for storing computer-executable instructions, wherein the computer-executable instructions are used for performing the model training method according to any one of the above embodiments.

The present application further provides a device for implementing model training, which comprises a memory and a processor, wherein the memory stores instructions executable by the processor, the instructions being used to perform steps of the model training method according to any one of the above embodiments.

In the image element matching method provided in the embodiments of the present application, the issue of finding image information matching a given image element is converted into the issue of predicting, from a matching knowledge graph, whether or not an edge is present between a node corresponding to the given image element and another node in the matching knowledge graph. Therefore, matching between image elements is flexibly implemented, matching performance is improved, and labor costs are reduced.

The model training method provided in the embodiments of the present application is suitable for large-scale image training. On the one hand, image elements in a matching knowledge graph are divided into a plurality of sub-graphs to perform subsequent matching model training, thus solving the difficulty in large-scale image training. On the other hand, feature information, such as visual features, of nodes is not pre-calculated but is continuously trained during model training, thus ensuring that a trained matching model provides ideal matching performance.

Furthermore, in the model training method of the present application, the matching model is a FedNet model and implements end-to-end training on large data, such that an obtained matching model achieves a better result.

Other features and advantages of the present invention will be described in the following description, and part of the features and advantages become obvious in the description or are understood by implementing the present invention. The objectives and other advantages of the present invention can be implemented or obtained by means of the structures specifically pointed out in the description, claims, and accompanying drawings.

BRIEF DESCRIPTION OF THE DRAWINGS

The accompanying drawings are used to provide a further understanding of the technical solutions of the present application and constitute a part of the description. Together with the embodiments of the present application, the drawings are used to explain the technical solution of the present application but do not constitute a limitation to the technical solution of the present application.

DETAILED DESCRIPTION

In order to clarify the objectives, technical solutions, and advantages of the present application, embodiments of the present application will be described in detail below with reference to the accompanying drawings. It should be noted that the embodiments of the present application and features in the embodiments can be combined with each other arbitrarily if there is no conflict.

In a typical configuration of the present application, a computing device includes one or more processors (CPU), an input/output interface, a network interface, and a memory.

The memory may include a computer-readable medium in the form of a non-permanent memory, a random-access memory (RAM) and/or non-volatile memory or the like, such as a read-only memory (ROM) or a Flash memory (e.g., Flash RAM). The memory is an example of the computer-readable medium.

The computer-readable medium includes permanent and non-permanent, removable and non-removable media, and can store information by any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other types of RAM, ROM, electrically erasable programmable read-only memories (EEPROM), flash memories or other memory technologies, compact disc read-only memories (CD-ROM), digital versatile disks (DVD) or other optical storage, magnetic tape cassettes, magnetic tape and magnetic disk storage or other magnetic storage devices, or any other non-transmission media, and the computer storage media can be used to store information that can be accessed by computing devices. According to the definitions herein, the computer-readable medium does not include non-transitory computer-readable media, such as a modulated data signal and a carrier wave.

Steps shown in the flow diagrams of the accompanying drawings can be performed in a computer system, such as a set of computer-executable instructions. Moreover, although a logical order is shown in the flow diagrams, in some cases, the steps shown or described herein may be performed in a different order.

Figure 1:
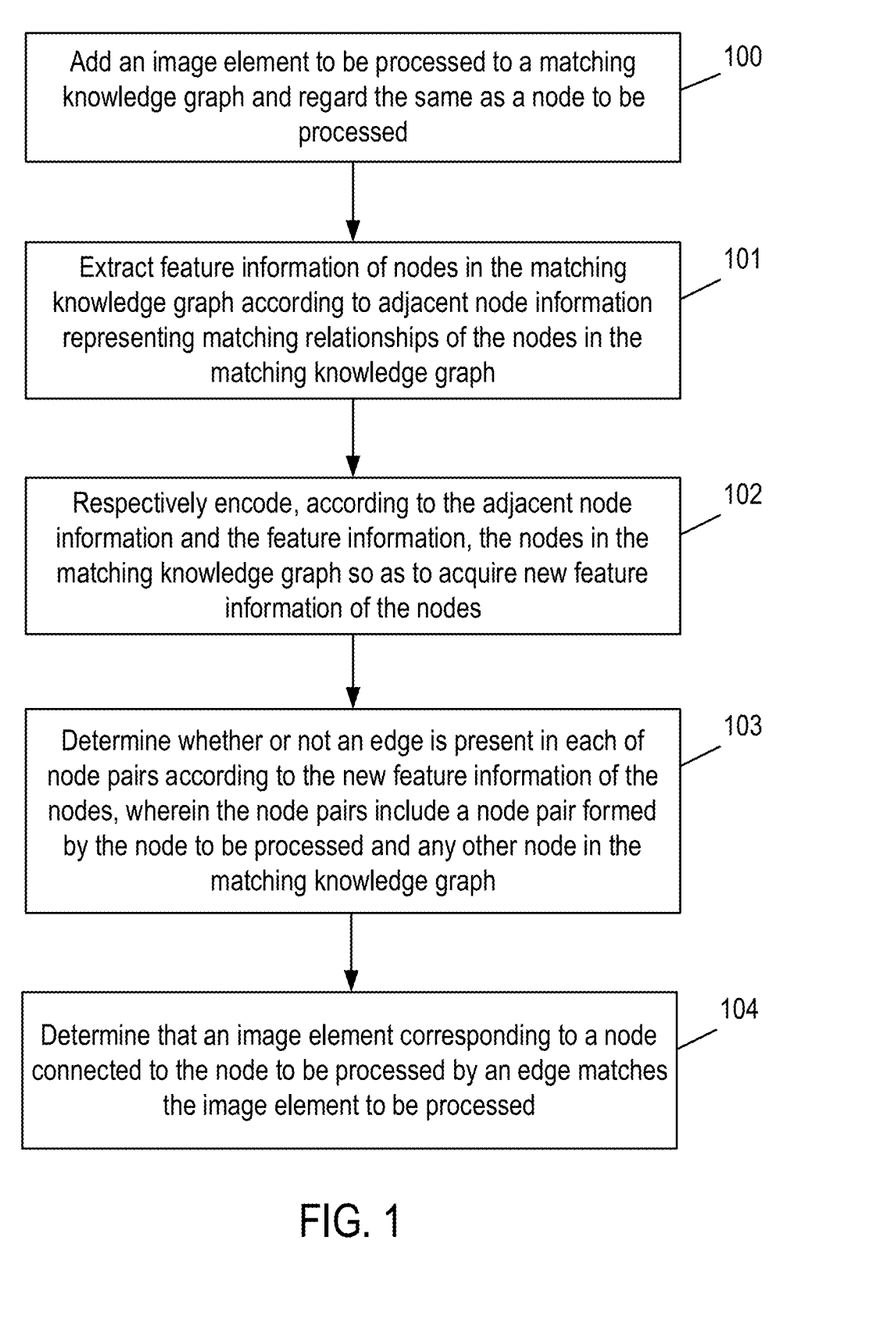
FIG. 1 is a flow diagram illustrating an image element matching method according to some embodiments of the disclosure.

FIG. 1 is a flow diagram illustrating an image element matching method according to some embodiments of the disclosure. As shown in FIG. 1, the method includes:

Step 100: Add an image element to be processed to a matching knowledge graph and use the same as a node to be processed.

In one embodiment, the matching knowledge graph is constructed in advance based on image elements of sample images and may include using PSD image information (e.g., including several image files, equivalent to PSD files) of banners as materials and parsing each PSD file to acquire several image layers included in the PSD file, each image layer serving as an independent image element. It can be considered that any two image elements in one PSD file are matched and coordinated with each other in design. In other words, every two image elements in each PSD file form a matching combination.

Independent image elements are regarded as nodes of the matching knowledge graph, and an edge is constructed between any two image elements in the same matching combination (that is, an edge is present between nodes that are matched and coordinated with each other). Therefore, a large matching knowledge graph can be constructed by using PSD image information of banners as materials, and the knowledge graph contains design knowledge used by a designer in the process of creating the banners.

In one embodiment, parsing each PSD file can be implemented by a related PSD parsing tool, and the specific implementation is not used to limit the protection scope of the present application and thus will not be repeated here.

In one embodiment, each image layer has an identifier (ID), and image layers having the same ID have the same image element, which is regarded as the same node in the matching knowledge graph.

A banner is a rectangular bulletin board across a web page. When users click on banners, they are usually directed to webpages of advertisers. The PSD image information of a banner is saved as a PSD file. Banner advertisements are the earliest form of online advertising and are currently the most common form. Banner advertisements are also referred to as banner ads.

In an exemplary example, it is assumed that a matching knowledge graph G has N nodes and M edges, wherein V={$v_1, v_2, \ldots, v_N$} represents a set of N nodes, E={($v_1, v_2$), ($v_3, v_4$), . . . , ($v_k, v_m$)} represents a set of M edges, ($v_i, v_j$) represents that an edge connected between a node IT, and a node $v_j$, and G=(V, E). If an N×N adjacency matrix A is used to represent the matching knowledge graph G, then when an edge connected between the node $v_i$ and the node $v_j$ is present, $A_{i,j}$=1; otherwise, $A_{i,j}$=0. X represents a node feature matrix. Each node contains F-dimensional features. Feature $X_i$ of the node $v_i$ represents {$x_{i,1}, x_{i,2}, \ldots, x_{i,F}$}. X is a matrix of N×F. In an exemplary example, the node features include visual features.

Figure 2A:
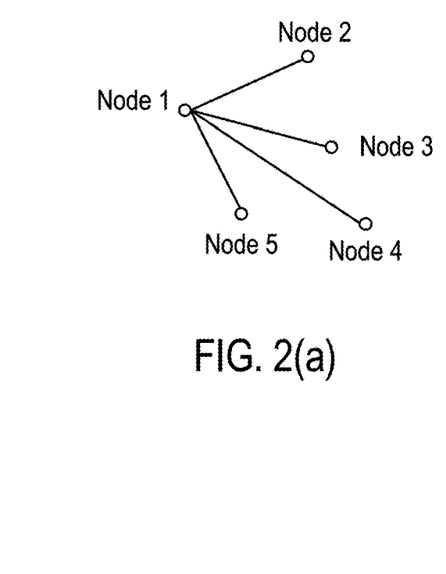
FIG. 2(a) is a block diagram of a first embodiment of constructing a matching knowledge graph according to some embodiments of the disclosure.
Figure 2B:
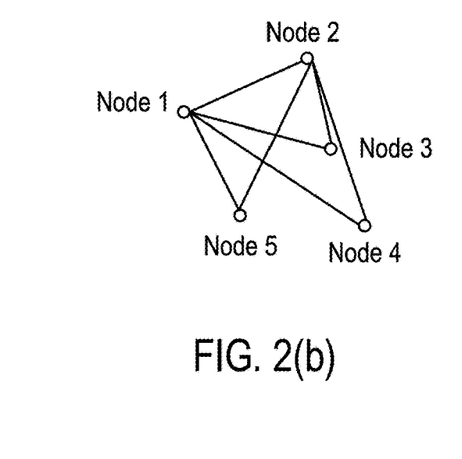
FIG. 2(b) is a block diagram of a second embodiment of constructing a matching knowledge graph according to some embodiments of the disclosure.
Figure 2C:
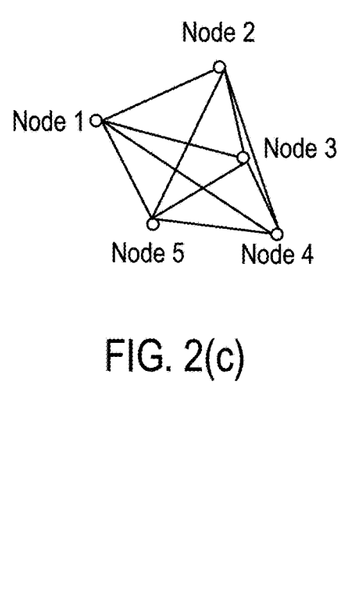
FIG. 2(c) is a block diagram of a third embodiment of constructing a matching knowledge graph according to some embodiments of the disclosure.
Figure 3:
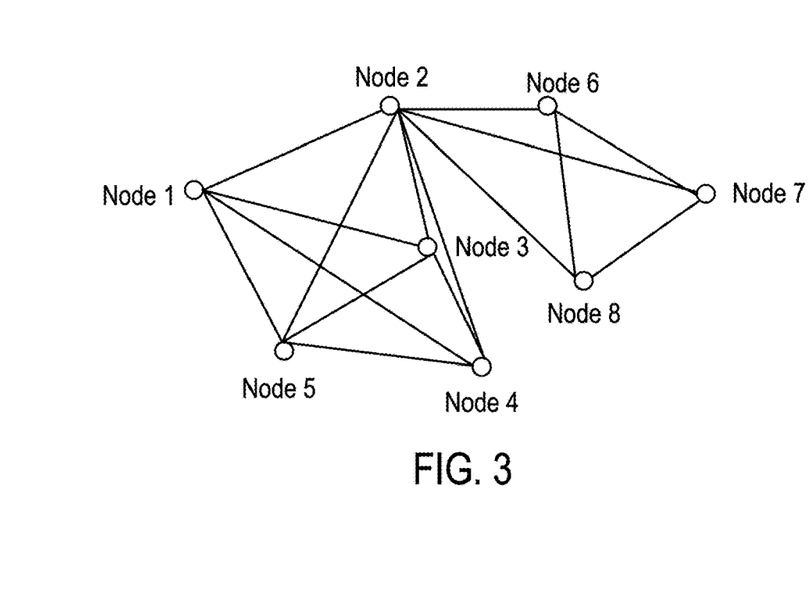
FIG. 3 is a block diagram of a fourth embodiment of constructing a matching knowledge graph according to some embodiments of the disclosure.

For example, a PSD1 file is parsed to acquire five image layers included in the PSD1 file. The image layers are regarded as independent image elements, as shown in FIG. 2(a) to FIG. 2(c), corresponding to node 1, node 2, node 3, node 4, and node 5, respectively. Any two image elements in the same PSD1 file are matched and coordinated with each other in design. In other words, any two of node 1, node 2, node 3, node 4, and node 5 form a matching combination. Constructed edges of the node 1 are shown in FIG. 2(a); constructed edges of node 1 and node 2 are shown in FIG. 2(b); and constructed edges of node 1, node 2, node 3, node 4, and node 5 are shown in FIG. 2(c). For another example, based on the matching knowledge graph shown in FIG. 2(c), a PSD2 file is further parsed to acquire four image layers included in the PSD2 file, wherein the image layers are regarded as independent image elements, as shown in FIG. 3, corresponding to node 2, node 6, node 7, and node 8, respectively. It can be seen that one of the image layers included in the PSD2 file shares the same image element with the image layer corresponding to node 2 in the PSD1 file, and therefore, the image layers are both represented as node 2 and have the same ID in the matching knowledge graph. Any two image elements in the same PSD2 file are matched and coordinated with each other in design. In other words, any two of node 2, node 6, node 7, and node 8 form a matching combination, and the constructed edges are shown in FIG. 3.

In Step 100, the image element to be processed is added to a pre-constructed matching knowledge graph and regarded as a node. Therefore, the issue of finding, in an element library, image information matching a given image element is converted into the issue of predicting, from the matching knowledge graph, whether or not an edge is present between a node corresponding to the given image element and another node in the matching knowledge graph.

Step 101: Extract feature information of nodes in the matching knowledge graph according to adjacent node information representing matching relationships of the nodes in the matching knowledge graph.

In one embodiment, the adjacent node information representing the matching relationships of the nodes in the matching knowledge graph may be represented by an adjacency matrix.

In one exemplary example, it is assumed that a matching knowledge graph G has N nodes and M edges, wherein V={$v_1, v_2, \ldots, v_N$} represents a set of N nodes, E={($v_1, v_2$), ($v_3, v_4$), . . . , ($v_k, v_m$)} represents a set of M edges, ($v_i, v_j$) represents that an edge connected between a node $v_i$ and a node $v_j$ is present, and G=(V, E). If an N×N adjacency matrix A is used to represent the matching knowledge graph G, then when an edge connected between the node $v_i$ and the node $v_j$ is present, $A_{i,j}$=1; otherwise, $A_{i,j}$=0. X represents a node feature matrix. Each node contains F-dimensional features. Feature $X_i$ of the node $v_i$ represents {$x_{i,1}, x_{i,2}, \ldots, x_{i,F}$}. X is a matrix of N×F. In an exemplary example, the node features include visual features.

In one embodiment, the extracting feature information of nodes in the matching knowledge graph in step 101 may include extracting a visual feature matrix X of the nodes by using a convolutional neural network. The convolutional neural network may include, but is not limited to, for example, an inception network structure (VGGNet or Inception Network), a residual network (ResNet), a dense convolutional network (DenseNet), and the like, wherein the VGGNet is proposed by the Computer Visual Geometry Group (VGG) from the University of Oxford.

Preferably, In one embodiment, the ResNet can be used to extract an image visual feature $X_i$ of each node i in the matching knowledge graph, and the visual features of all nodes form a feature matrix X in the matching knowledge graph.

Step 102: Respectively encode, according to the adjacent node information and the feature information, the nodes in the matching knowledge graph to acquire new feature information of the nodes.

In one embodiment, step 102 may include inputting the adjacency matrix and the feature information into a multi-layer graph convolutional neural network and respectively encoding the nodes in the matching knowledge graph to acquire new feature information of the nodes in the matching knowledge graph.

In step 102, the information input into the multi-layer graph convolutional neural network includes the feature information of any node $v_i$ and the adjacency matrix. Therefore, for any node $v_i$, the obtained new feature information $z_i$ includes not only encoded information of the node but also encoded information of another node matching the node.

In one embodiment, for the node $v_i$ and the neighbor node $N_i$ of the node $v_i$, $N_i$={$v_j | A_{i,j}$=1}, and $z_i$=$f_{encoder}$ ($X_i, N_i$), wherein $f_{encoder}$ is implemented by a multi-layer graph convolutional neural network (GCN). The implementation of a certain layer of the GCN can be shown in formula (1):

$$z_i^{(l+1)} = \text{ReLU}(z_i^{(l)} w_0^{(l)} + \Sigma_{j \in N_i} 1/N_i | z_j^{(l)} w_1^{(l)}) \tag{1}$$

In formula (1), $z_i^{(l)}$ represents the i-th node of the l-th layer, $z_i^{(l+1)}$ is an output value of $z_i^{(l)}$, ReLU is an activation layer, and after all nodes in the matching knowledge graph are processed by the GCN shown in formula (1), a result is output as shown in formula (2):

$$z^{(l+1)} = ReLU\left(\sum_{j=0}^{s} \hat{A}_j z^{(l)} W_j^{(l)}\right) \tag{2}$$

In formula (2), $\hat{A}_j$ represents a Laplacian matrix of the adjacency matrix A, $\hat{A}=I-D^{-1/2}AD^{-1/2}$, wherein I represents an identity matrix, D represents a degree matrix of a vertex $D_{i,i}=\Sigma_{j=0}^{N}A_{i,j}$, s represents the s-order neighbor node of the node, and $W^{(l)}$ represents a learning parameter of the l-th layer. In the first learning, $W^{(l)}$ can be initialized using, for example, kaiming_uniform.

Step 103: Determine node pairs, each of which has an edge therein according to the new feature information of the nodes, wherein the node pairs comprise a node pair formed by the node to be processed and any other node in the matching knowledge graph.

In one embodiment, the step 103 may include determining whether or not an edge is present in the node pair by calculating an edge connection probability of the node pair (equivalent to a matching score). In an exemplary example, the edge connection probability $p_{i,j}$ of the node pair (i.e., the node i and the node j) can be calculated as shown in formula (3):

$$p_{i,j}=h(z_i-z_j)w+b \quad (3)$$

In formula (3), $z_i$ and $z_j$ represent new feature information obtained after the node $v_i$ and the node $v_j$ are encoded (Encoder) in step 102; w and b represent learning parameters, and h(•) represents a sigmoid activation function.

Step 104: Determine that an image element corresponding to a node that is connected to the node to be processed by an edge matches the image element to be processed.

In the image element matching method provided in the present application, the issue of finding, in an element library, image information matching a given image element is converted into the issue of predicting, from a matching knowledge graph, whether or not an edge is present between a node corresponding to the given image element and another node in the matching knowledge graph. Therefore, matching between image elements is flexibly implemented, matching performance is improved, and labor costs are reduced.

The present application further provides a computer-readable storage medium for storing computer-executable instructions, wherein the computer-executable instructions are used for performing the image element matching method according to any item shown in FIG. 1.

The present application further provides a device for implementing image element matching, which includes a memory and a processor, wherein the memory stores instructions executable by the processor, the instructions being used to perform steps of the image element matching method according to any item shown in FIG. 1.

Figure 4:
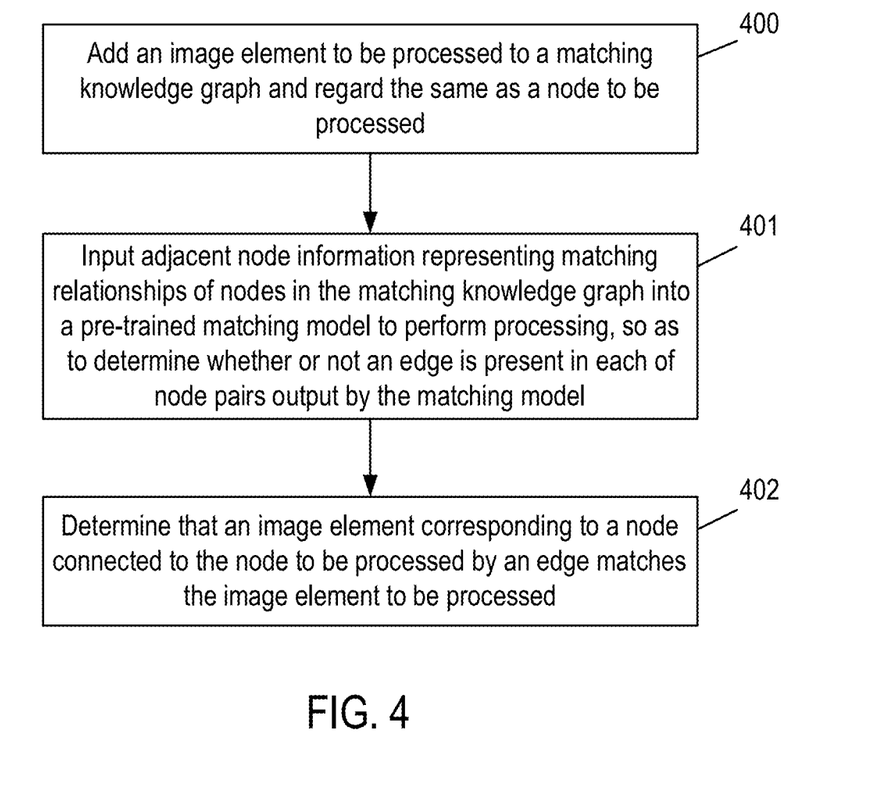
FIG. 4 is a flow diagram illustrating an image element matching method according to some embodiments of the disclosure.

FIG. 4 is a flow diagram illustrating another image element matching method according to some embodiments of the disclosure. The method includes the following steps.

Step 400: Add an image element to be processed to a matching knowledge graph and use the same as a node to be processed.

Step 401: Input adjacent node information representing matching relationships of nodes in the matching knowledge graph into a pre-trained matching model to perform processing to determine whether or not an edge is present in a node pair output by the matching model.

In one embodiment, the processing in step 401 includes extracting feature information of the nodes in the matching knowledge graph according to adjacent node information representing matching relationships of the nodes in the matching knowledge graph; respectively encoding, according to the adjacent node information and the feature information, the nodes in the matching knowledge graph to acquire new feature information of the nodes; and determining whether or not an edge is present in each of node pairs according to the new feature information of the nodes, wherein the node pairs include a node pair formed by the node to be processed and any other node in the matching knowledge graph.

Step 402: Determine that an image element corresponding to a node that is connected to the node to be processed by an edge matches the image element to be processed.

Figure 6:
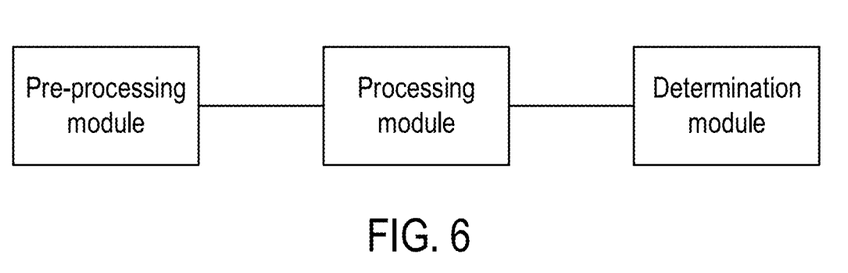
FIG. 6 is a block diagram of an image element matching apparatus according to some embodiments of the disclosure.

The difference between the image element matching method shown in FIG. 4 and that shown in FIG. 1 is that compared with the implementation of steps 101 through step 103 in FIG. 1, the image element matching method shown in FIG. 4 is implemented using a pre-trained matching model. The training method of the matching model is shown in FIG. 6 below.

The present application further provides a computer-readable storage medium for storing computer-executable instructions, wherein the computer-executable instructions are used for performing the image element matching method according to any item shown in FIG. 4.

The present application further provides a device for implementing image element matching, which includes a memory and a processor, wherein the memory stores instructions executable by the processor, the instructions being used to perform steps of the image element matching method according to any item shown in FIG. 4.

Figure 5:
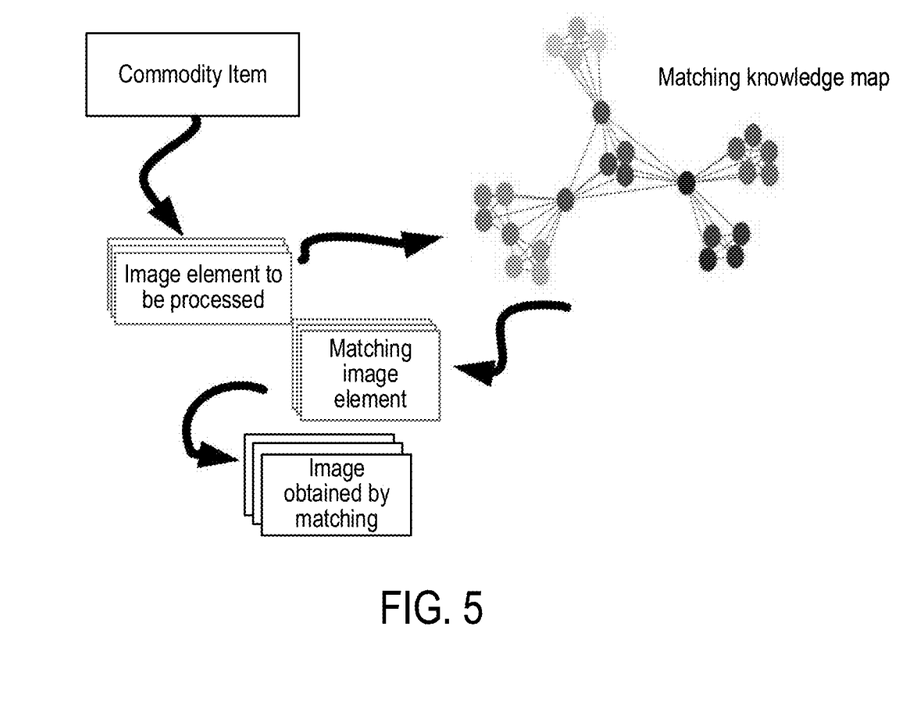
FIG. 5 is a block diagram of an application embodiment of image element matching according to some embodiments of the disclosure.

In one embodiment, a data processing method is further provided in the present application, including receiving an image to be processed; acquiring at least one original image element in the image to be processed; acquiring, based on a knowledge graph, a target image element corresponding to the original image element, wherein image elements are regarded as nodes and relationships between the image elements are regarded as edges in the knowledge graph; and returning the target image element. Here, a user uploading an image of a commodity item is used as an example. As shown in FIG. 5, by means of the image element matching method provided in the embodiment of the present application, matching can be automatically performed on the image of the commodity item to obtain, from the knowledge graph, required image information, for example, one or a plurality of images matching the image of the commodity item uploaded by the user. Accordingly, a matching image can be recommended to the user and then used by the user, or a plurality of matching images can be presented to the user and then selected by the user. In one embodiment, the image element itself can also directly serve as the image to be processed in FIG. 5. By means of the data processing method described in the present application, matching can be automatically performed on the image element to be processed to obtain a set of image elements from the knowledge graph. Accordingly, the set of image elements obtained by means of matching can be recommended in a comprehensive manner.

FIG. 6 is a block diagram of an image element matching apparatus according some embodiments of the disclosure, including, as shown in FIG. 6, a pre-processing module, a processing module, and a determination module.

In the illustrated embodiment, the pre-processing module is configured to add an image element to be processed to a matching knowledge graph and using the same as a node to be processed.

In the illustrated embodiment, the processing module is configured to: extract feature information of nodes in the matching knowledge graph according to adjacent node information representing matching relationships of the nodes in the matching knowledge graph; respectively encode, according to the adjacent node information and the feature information, the nodes in the matching knowledge graph to acquire new feature information of the nodes; and determine node pairs, each of which has an edge therein according to the new feature information of the nodes, wherein the node pairs include a node pair formed by the node to be processed and any other node in the matching knowledge graph.

In the illustrated embodiment, the determination module is configured to determine that an image element corresponding to a node that is connected to the node to be processed by an edge matches the image element to be processed.

In one embodiment, the processing module may be a pre-trained matching model. The input of the matching model is adjacent node information representing the matching relationships of the nodes in the matching knowledge graph, and the output of the matching model is regarding whether or not an edge is present in the node pair.

Figure 7:
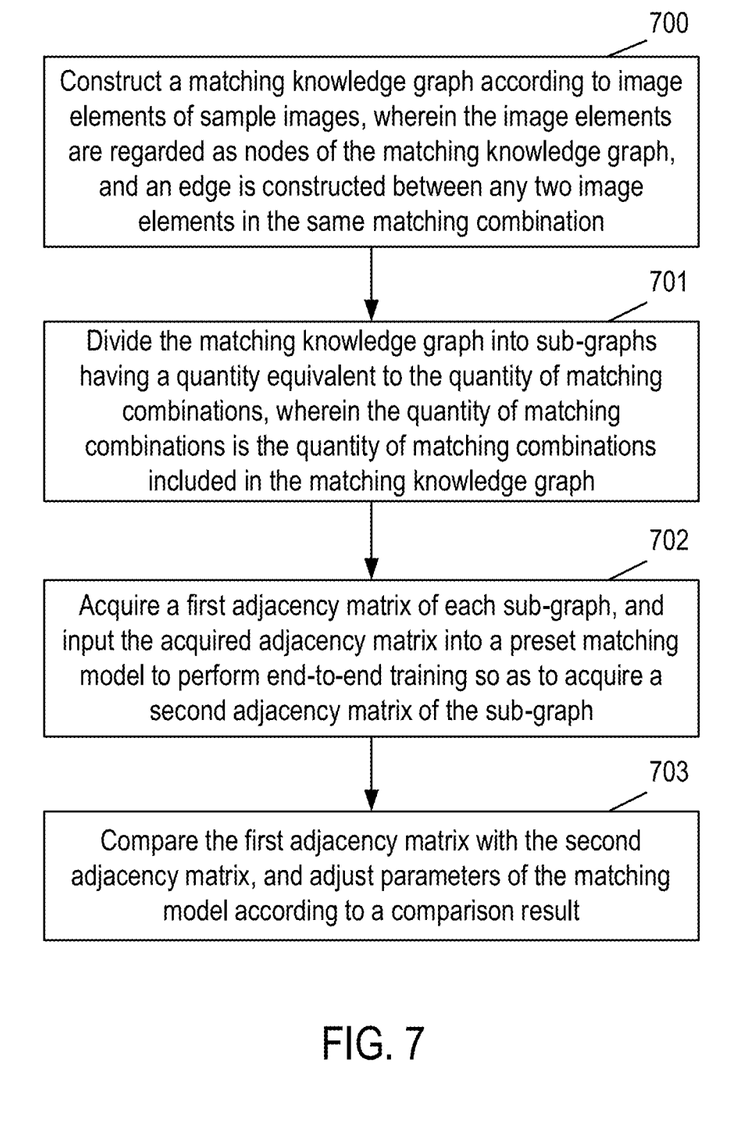
FIG. 7 is a flow diagram illustrating a model training method according to some embodiments of the disclosure.

FIG. 7 is a flow diagram illustrating a model training method according to some embodiments of the disclosure. In the illustrated embodiment, the method includes the following steps.

Step 700: Construct a matching knowledge graph according to image elements of sample images, wherein the image elements are regarded as nodes of the matching knowledge graph, and an edge is constructed between any two image elements in the same matching combination.

In one embodiment, the sample images may use PSD image information (e.g., including several image files, equivalent to PSD files) of a large number of banners as materials, and each PSD file can be parsed to acquire several image layers included in the PSD file. Each image layer is regarded as an independent image element. It can be considered that any two image elements in one PSD file are matched and coordinated with each other in design. In other words, every two image elements in each PSD file form a matching combination.

Independent image elements are regarded as the nodes of the matching knowledge graph, and an edge is constructed between any two image elements in the same matching combination (that is, an edge is present between nodes that are matched and coordinated with each other). Therefore, a large matching knowledge graph can be constructed by using PSD image information of a large number of banners as materials, and the knowledge graph contains design knowledge used by a designer in the process of creating the banners.

Step 701: Divide the matching knowledge graph into sub-graphs having a quantity equivalent to the number of matching combinations, wherein the number of matching combinations is the number of matching combinations comprised in the matching knowledge graph.

In one embodiment, it is assumed that a matching knowledge graph G includes Q matching combinations, and dividing the matching knowledge graph G into sub-graphs having a quantity equivalent to the number of matching combinations in the present step includes the following process.

In the matching knowledge graph G, the method forms the sub-graph by obtaining kth-order neighbor nodes from all nodes in each matching combination and dividing the matching knowledge graph G into Q sub-graphs, wherein each sub-graph $G_q$ includes a matching combination and kth-order adjacent nodes obtained from nodes of the matching combination. In addition, k is a hyperparameter in the training process, and different training results may be obtained by configuring different k values.

In the present step, image elements in the matching knowledge graph G are divided into a plurality of sub-graphs to perform subsequent matching model training, thus solving the difficulty in large-scale image training.

Step 702: Acquire a first adjacency matrix of each sub-graph, and inputting the acquired adjacency matrix into a preset matching model to perform end-to-end training to acquire a second adjacency matrix of the sub-graph.

In one embodiment, the acquiring a first adjacency matrix $A_q$ of each sub-graph $G_q$ in the present step includes constructing a positive edge set and a negative edge set for each sub-graph $G_q$, regarding edges connected between two nodes of all the nodes in the matching combination of the sub-graph $G_q$ as the positive edge set, and randomly selecting edges formed by unconnected node pairs, having the same quantity as that in the positive edge set, as the negative edge set, wherein when an edge connected between a node $v_i$ and a node $v_j$ is present in the sub-graph $G_q$, $A_{i,j}=1$; otherwise, $A_{i,j}=0$.

Figure 8:
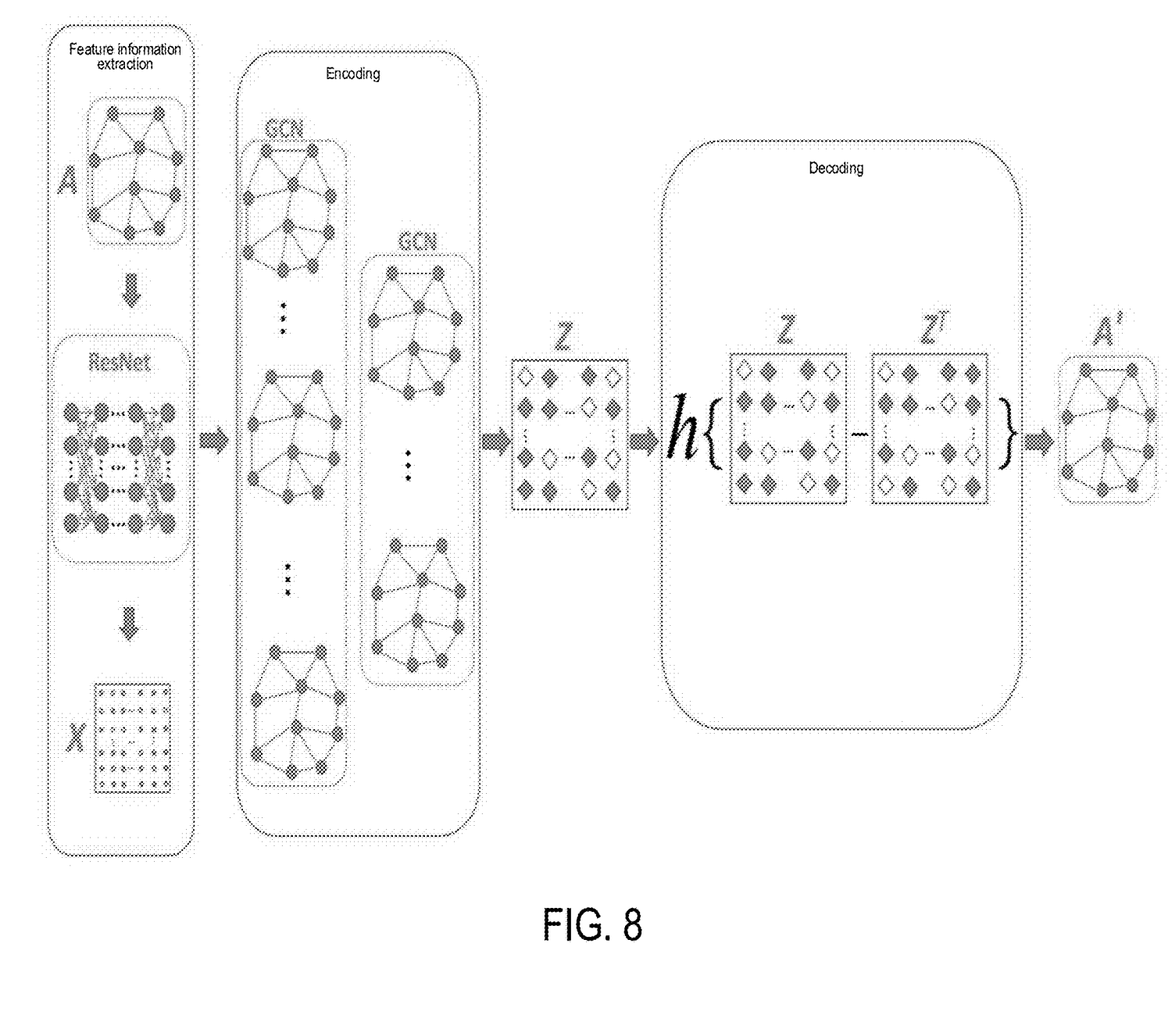
FIG. 8 is a block diagram of a matching network according to some embodiments of the disclosure.

In one embodiment, for each sub-graph, with reference to FIG. 8, the inputting the acquired adjacency matrix into a preset matching model to perform end-to-end training to acquire a second adjacency matrix of the sub-graph in Step 702 may include extracting feature information of nodes in the sub-graph according to the first adjacency matrix representing matching relationships of the nodes in the sub-graph; respectively encoding, according to the first adjacency matrix and the feature information, the nodes in the sub-graph to acquire new feature information of the nodes; and determining whether or not an edge is present in a node pair according to the new feature information of the nodes, wherein the node pair is a node pair in the sub-graph, and decoding (Decoder) to obtain the second adjacency matrix of the matching relationships of the nodes in the sub-graph. As shown in formula (3), $p_{i,j}$ is a value of the i, j location in the second adjacency matrix. In other words, the second adjacency matrix is composed of predicted matching scores of all the node pairs.

In the present application, the feature information, such as visual features, of the nodes is not pre-calculated but is continuously trained during model training, thus ensuring that a trained matching model provides ideal matching performance.

In one embodiment, the extracting feature information of nodes in the sub-graph in the present step may include extracting a visual feature matrix X of the nodes by using a convolutional neural network. The convolutional neural network may include but is not limited to, for example, a VGGNet or Inception Network, a ResNet, a DenseNet, and the like.

In one embodiment, the ResNet can be used to extract an image visual feature $X_i$ of each node i in the matching knowledge graph, and the visual features of all nodes form a feature matrix X in the matching knowledge graph.

In one embodiment, the respectively encoding, according to the first adjacency matrix and the feature information, the nodes in the sub-graph to acquire new feature information of the nodes in the present step may include inputting the first adjacency matrix and the feature information into a multi-layer graph convolutional neural network, and respectively encoding the nodes in the sub-graph to acquire new feature information of the nodes in the sub-graph. For a specific implementation, reference can be made to the description of formula (1) and formula (2) above, which will not be repeated here.

In this step, the information input into the multi-layer graph convolutional neural network includes the feature information of any node $v_i$ and the first adjacency matrix. Therefore, for any node $v_i$, the obtained new feature information $z_i$ includes not only encoded information of the node but also encoded information of another node matching the node.

In one embodiment, determining a node pair with an edge in the present step may include: determining whether or not an edge is present in the node pair by calculating an edge connection probability of the node pair (equivalent to a matching score). For a specific implementation, reference can be made to the description of formula (3) and step 103 above, which will not be repeated here.

In one embodiment, the matching model includes a feature extraction portion (Featurer), an encoding portion (Encoder), and a decoding portion (Decoder), and can be referred to as a FedNet model herein.

The FedNet model can perform end-to-end training on large data, such that the obtained matching model achieves a better result.

Step 703: Compare the first adjacency matrix with the second adjacency matrix and adjusting parameters of the matching model according to a comparison result.

In one embodiment, the present step may include using a Focal Loss function $FL(pt)=-\alpha t (1-pt)\beta \log(pt)$, wherein $\alpha t$ and $\beta$ are hyperparameters of a new joint model, and values thereof in a trial may be, for example, $\alpha t=0.5$, $\beta=1$, and a loss is calculated for each sample as $lossi=FL(pt)$; obtaining an average value of the losses of all samples and regarding the same as a target loss; and updating the parameters of the matching model according to the target loss by using a backpropagation algorithm, wherein the samples include positive samples and negative samples. Edges $e_{i,j}$ formed by node pairs $(v_i, v_j)$ with $A_{i,j}=1$ in the first adjacency matrix are regarded as positive samples, and a certain portion thereof are randomly sampled from $A_{i,j}=0$ and regarded as negative samples. The second adjacency matrix is composed of predicted matching scores of all the node pairs, and predicted scores of edges $e_{i,j}$ composed by the node pairs $(v_i, v_j)$ are $\overline{A}_{i,j}$. Therefore, a true value for all the positive samples is 1, and a true value for all the negative samples is 0. If a mathematical symbol is assumed to be $p_t$, then the positive sample is represented as $p_t=p_{i,j}$, and the negative sample is represented as $p_t=1-p_{i,j}$.

The model training method provided in the present application is suitable for large-scale image training. On the one hand, image elements in a matching knowledge graph are divided into a plurality of sub-graphs to perform subsequent matching model training, thus solving the difficulty in large-scale image training. On the other hand, feature information, such as visual features, of nodes is not pre-calculated but is continuously trained during model training, thus ensuring that a trained matching model provides ideal matching performance. Furthermore, in the model training method of the present application, the matching model is a FedNet model and implements end-to-end training on large data, such that the obtained matching model achieves a better result.

It should be noted that the image element matching method shown in FIG. 4 is also a training process for the matching model. In other words, training the matching model of the present application not only includes using samples to perform pre-training, but real-time training is also performed dynamically in the process of implementing the matching model, which further ensures the practicability of the matching model.

The present application further provides a computer-readable storage medium for storing computer-executable instructions, wherein the computer-executable instructions are used for performing the model training method according to any item above.

The present application further provides a device for implementing matching model training, which includes a memory and a processor, wherein the memory stores instructions executable by the processor, the instructions being used to perform steps of the model training method according to any item above.

Figure 9:
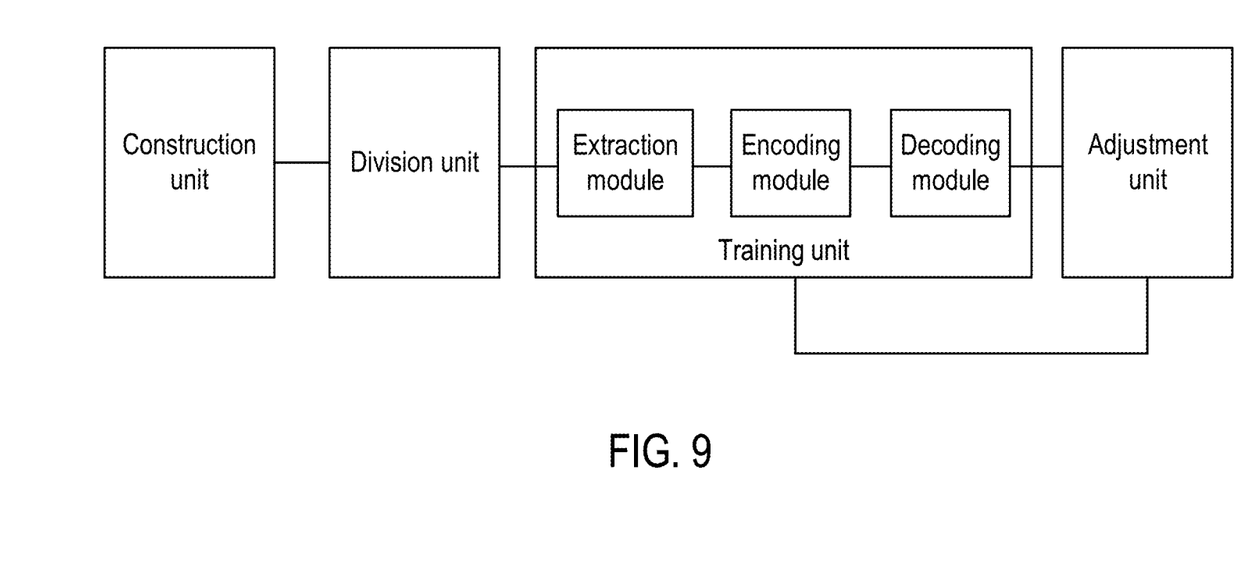
FIG. 9 is a block diagram of a model training apparatus according to some embodiments of the disclosure.

FIG. 9 is a block diagram of a model training apparatus according to the present application, including as shown in FIG. 9: a construction unit, a division unit, a training unit, and an adjustment unit.

In the illustrated embodiment, the construction unit is configured to construct a matching knowledge graph according to image elements of sample images, wherein the image elements are regarded as nodes of the matching knowledge graph, and an edge is constructed between any two image elements in the same matching combination.

In the illustrated embodiment, the division unit is configured to divide the matching knowledge graph into sub-graphs having a quantity equivalent to the number of matching combinations, wherein the number of matching combinations is the number of matching combinations included in the matching knowledge graph.

In the illustrated embodiment, the training unit is configured to acquire a first adjacency matrix of each sub-graph and to input the acquired adjacency matrix into a preset matching model to perform end-to-end training to acquire a second adjacency matrix of the sub-graph.

In the illustrated embodiment, the adjustment unit is configured to compare the first adjacency matrix with the second adjacency matrix and to adjust parameters of the matching model according to a comparison result.

In one embodiment, the training unit may include: an extraction module, an encoding module, and a decoding module.

In this embodiment, the extraction module is configured to extract feature information of nodes in the sub-graph according to the first adjacency matrix representing matching relationships of the nodes in the sub-graph.

In this embodiment, the encoding module is configured to respectively encode, according to the first adjacency matrix and the feature information, the nodes in the sub-graph to acquire new feature information of the nodes.

In this embodiment, the decoding module is configured to determine whether or not an edge is present in a node pair according to the new feature information of the nodes, wherein the node pair is a node pair in the sub-graph, and to perform decoding to obtain the second adjacency matrix of the matching relationships of the nodes in the sub-graph.

In one embodiment, the extraction module may be a ResNet.

In one embodiment, the training unit may be a FedNet model.

The FedNet model may perform end-to-end training on large data, such that the obtained matching model achieves a better result.

Although the embodiments of the present application are disclosed as above, the content described therein is only embodiments used to facilitate the understanding of the present application and is not intended to limit the present application. A person skilled in the art to which the present application belongs can make any modifications or changes in the implementation form or details insofar as the modifications or changes do not depart from the spirit and scope disclosed in the present application. However, the scope of patent protection of the present application should still be subject to the scope defined by the appended claims.

What is claimed is:

1. A method comprising:
building a knowledge graph based on a plurality of training images, each training image in the plurality of training images containing a set of layers, wherein the knowledge graph stores image elements associated with layers as nodes and relationships between the image elements as edges, wherein at least two training images include an identical image layer;
receiving an image to be processed from a computing device, the image having a plurality of layers, each layer in the plurality of layers having a unique identifier corresponding to an image element;
identifying an original image element in the image to be processed from the plurality of layers;
identifying, using a knowledge graph, a target image element corresponding to the original image element, the target image element corresponding to a layer in one of the plurality of training images; and
returning the target image element to the computing device.

2. The method of claim 1, further comprising constructing the knowledge graph based on image elements of sample images, the image elements of the sample images used as the nodes of the knowledge graph.

3. The method of claim 1, further comprising:
adding the original image element to be processed to the knowledge graph as a new node;
extracting feature information of nodes in the knowledge graph according to adjacent node information representing matching relationships of the nodes in the knowledge graph;
respectively encoding, according to the adjacent node information and the feature information, the nodes in the knowledge graph to acquire new feature information of the nodes;
determining node pairs each node pair having an edge associated with the new feature information of the nodes, the node pairs comprising a node pair formed by the new node and another node in the knowledge graph; and
determining that an image element corresponding to a node which is connected to the new node by an edge matches the image element to be processed.

4. The method of claim 3, further comprising:
obtaining sample images from Photoshop Document (PSD) files by parsing each PSD file, each PSD file including a plurality of image layers, each image layer comprising one or more independent image elements; and
using the one or more independent image elements as the nodes of the knowledge graph, and constructing an edge between two image elements.

5. The method of claim 3, wherein the feature information comprises an adjacency matrix and extracting feature information of nodes in the knowledge graph comprises extracting a visual feature matrix of the nodes according to the adjacency matrix using a convolutional neural network (CNN).

6. The method of claim 5, the respectively encoding the nodes in the knowledge graph comprising inputting the adjacency matrix and the feature information into a multi-layer graph CNN, and respectively encoding the nodes in the knowledge graph to acquire new feature information of the nodes in the knowledge graph.

7. The method of claim 3, the determining node pairs each of which has an edge therein comprising determining that an edge is present in the node pair by calculating an edge connection probability of the node pair.

8. A non-transitory computer-readable storage medium for tangibly storing computer program instructions capable of being executed by a computer processor, the computer program instructions defining steps of:
building a knowledge graph based on a plurality of training images, each training image in the plurality of training images containing a set of layers, wherein the knowledge graph stores image elements associated with layers as nodes and relationships between the image elements as edges, wherein at least two training images include an identical image layer;
receiving an image to be processed from a computing device, the image having a plurality of layers, each layer in the plurality of layers having a unique identifier corresponding to an image element;
identifying an original image element in the image to be processed from the plurality of layers;
identifying, using a knowledge graph, a target image element corresponding to the original image element, the target image element corresponding to a layer in one of the plurality of training images; and
returning the target image element to the computing device.

9. The non-transitory computer-readable storage medium of claim 8, the computer program instructions defining a step of constructing the knowledge graph based on image elements of sample images, the image elements of the sample images used as the nodes of the knowledge graph.

10. The non-transitory computer-readable storage medium of claim 8, the computer program instructions further defining steps of:
adding the original image element to be processed to the knowledge graph as a new node;
extracting feature information of nodes in the knowledge graph according to adjacent node information representing matching relationships of the nodes in the knowledge graph;
respectively encoding, according to the adjacent node information and the feature information, the nodes in the knowledge graph to acquire new feature information of the nodes;
determining node pairs each node pair having an edge associated with the new feature information of the nodes, the node pairs comprising a node pair formed by the new node and another node in the knowledge graph; and
determining that an image element corresponding to a node which is connected to the new node by an edge matches the image element to be processed.

11. The non-transitory computer-readable storage medium of claim 10, the computer program instructions further defining steps of:
obtaining sample images from Photoshop Document (PSD) files by parsing each PSD file, each PSD file including a plurality of image layers, each image layer comprising one or more independent image elements; and
using the one or more independent image elements as the nodes of the knowledge graph, and constructing an edge between two image elements.

12. The non-transitory computer-readable storage medium of claim 10, wherein the feature information comprises an adjacency matrix and extracting feature information of nodes in the knowledge graph comprises extracting a visual feature matrix of the nodes according to the adjacency matrix using a convolutional neural network (CNN).

13. The non-transitory computer-readable storage medium of claim 12, the respectively encoding the nodes in the knowledge graph comprising inputting the adjacency matrix and the feature information into a multi-layer graph CNN, and respectively encoding the nodes in the knowledge graph to acquire new feature information of the nodes in the knowledge graph.

14. The non-transitory computer-readable storage medium of claim 10, the determining node pairs each of which has an edge therein comprising determining that an edge is present in the node pair by calculating an edge connection probability of the node pair.

15. A device comprising:
- a processor; and
- a storage medium for tangibly storing thereon program logic for execution by the processor, the program logic comprising:
  - logic, executed by the processor, for building a knowledge graph based on a plurality of training images, each training image in the plurality of training images containing a set of layers, wherein the knowledge graph stores image elements associated with layers as nodes and relationships between the image elements as edges, wherein at least two training images include an identical image layer;
  - logic, executed by the processor, for receiving an image to be processed from a computing device, the image having a plurality of layers, each layer in the plurality of layers having a unique identifier corresponding to an image element;
  - logic, executed by the processor, for identifying an original image element in the image to be processed from the plurality of layers;
  - logic, executed by the processor, for identifying, using a knowledge graph, a target image element corresponding to the original image element, the target image element corresponding to a layer in one of the plurality of training images; and
  - logic, executed by the processor, for returning the target image element to the computing device.

16. The device of claim 15, the program logic further comprising logic, executed by the processor, for constructing the knowledge graph based on image elements of sample images, the image elements of the sample images used as the nodes of the knowledge graph.

17. The device of claim 15, the program logic further comprising:
- logic, executed by the processor, for adding the original image element to be processed to the knowledge graph as a new node;
- logic, executed by the processor, for extracting feature information of nodes in the knowledge graph according to adjacent node information representing matching relationships of the nodes in the knowledge graph;
- logic, executed by the processor, for respectively encoding, according to the adjacent node information and the feature information, the nodes in the knowledge graph to acquire new feature information of the nodes;
- logic, executed by the processor, for determining node pairs each node pair having an edge associated with the new feature information of the nodes, the node pairs comprising a node pair formed by the new node and another node in the knowledge graph; and
- logic, executed by the processor, for determining that an image element corresponding to a node which is connected to the new node by an edge matches the image element to be processed.

18. The device of claim 17, the program logic further comprising:
- logic, executed by the processor, for obtaining sample images from Photoshop Document (PSD) files by parsing each PSD file, each PSD file including a plurality of image layers, each image layer comprising one or more independent image elements; and
- logic, executed by the processor, for using the one or more independent image elements as the nodes of the knowledge graph, and constructing an edge between two image elements.

19. The device of claim 17, wherein the feature information comprises an adjacency matrix and extracting feature information of nodes in the knowledge graph comprises extracting a visual feature matrix of the nodes according to the adjacency matrix using a convolutional neural network (CNN).

20. The device of claim 17, the determining node pairs each of which has an edge therein comprising determining that an edge is present in the node pair by calculating an edge connection probability of the node pair.

* * * * *